United States Patent [19]

Kinnan

[11] 4,430,022
[45] Feb. 7, 1984

[54] UNDERGROUND CABLE INSTALLING APPARATUS AND METHOD UTILIZING A MULTI-POSITIONABLE PLOW BLADE

[75] Inventor: Frank Kinnan, Camas Valley, Oreg.

[73] Assignee: Electric Power Research Institute, Inc., Palo Alto, Calif.

[21] Appl. No.: 269,955

[22] Filed: Jun. 3, 1981

[51] Int. Cl.³ .............................................. E02F 5/10
[52] U.S. Cl. .................... 405/183; 405/174; 405/177; 37/193; 172/477
[58] Field of Search .............. 254/134.3 R, 134.3 FT, 254/29 R; 405/174, 175, 180, 181, 183; 37/193; 414/682, 687, 689; 172/207, 214, 292, 477; 182/2

[56] References Cited

U.S. PATENT DOCUMENTS

| | | | |
|---|---|---|---|
| Re. 26,718 | 11/1969 | Kelley | 405/180 |
| 2,984,373 | 5/1961 | Przybylski | 414/687 X |
| 2,998,861 | 9/1961 | Hotchkiss | 182/2 |
| 3,283,850 | 11/1966 | Jones et al. | 182/2 |
| 3,291,256 | 12/1966 | Eitel | 182/2 X |
| 3,926,263 | 12/1975 | Frisbee et al. | 405/183 X |
| 4,014,175 | 3/1977 | Brink | 37/193 X |
| 4,040,261 | 8/1977 | Schuck et al. | 405/183 X |

Primary Examiner—Frederick R. Schmidt
Assistant Examiner—Steven P. Schad
Attorney, Agent, or Firm—Flehr, Hohbach, Test, Albritton & Herbert

[57] ABSTRACT

An underground cable installing apparatus is disclosed herein along with its method of operation. The apparatus utilizes a power driven land vehicle and an elongated cable laying plow blade supported by and for movement with the vehicle in a way which places a lowermost end portion of the blade in the ground with its cutting edge disposed in the direction of vehicular movement. As the blade moves through the ground it lays cable in its path from a cooperating cable feeding mechanism. In accordance with one operational feature of the apparatus provided herein, its plow blade is supported for movement relative to its vehicle between a number of different operating positions including positions in front of and behind the vehicle as well as various positions on either side thereof. In accordance with another feature, the cable itself is fed from a supply wound about a drum or reel which is supported in an adjustable fashion on the vehicle.

12 Claims, 8 Drawing Figures

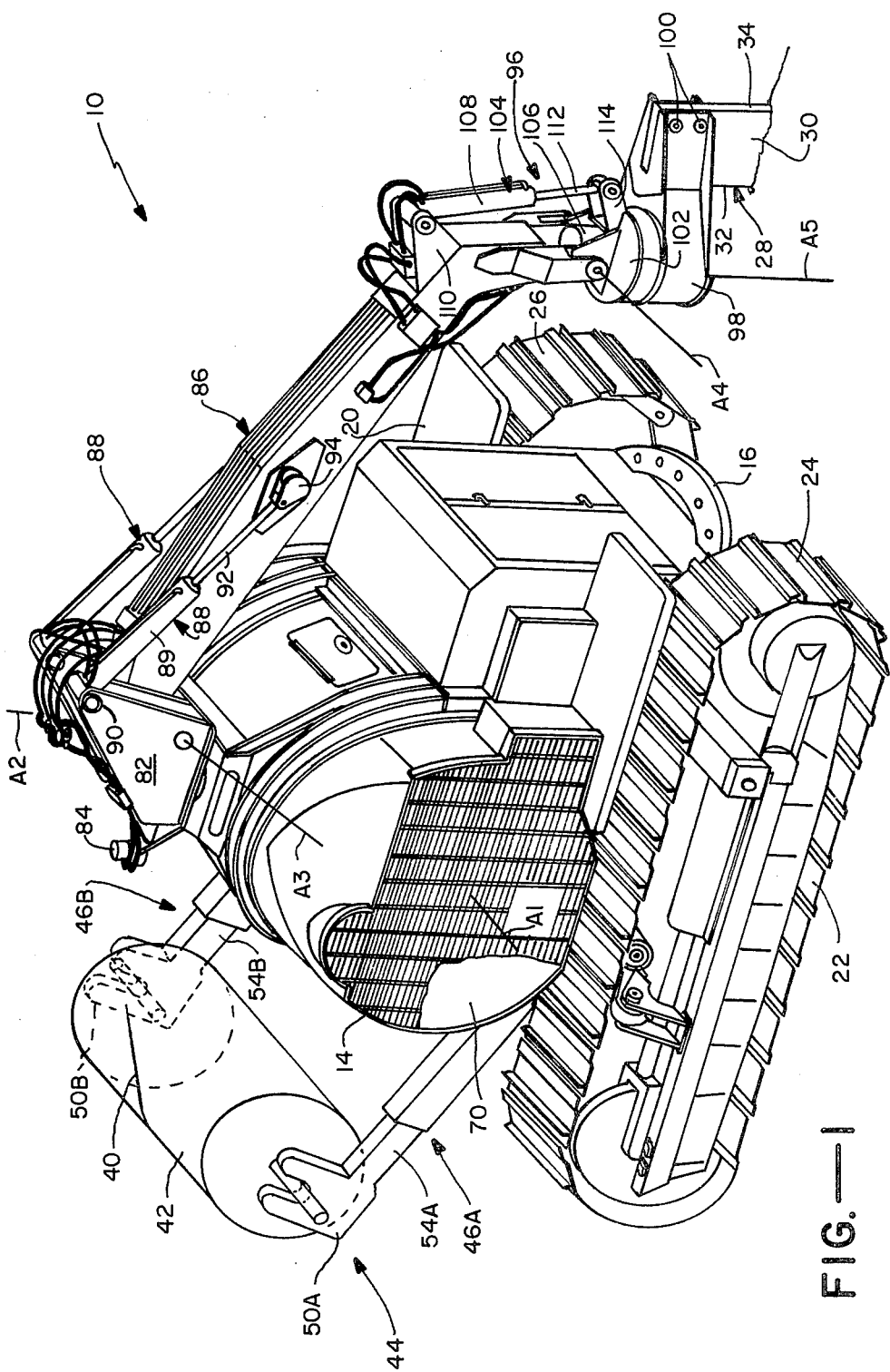
FIG.—1

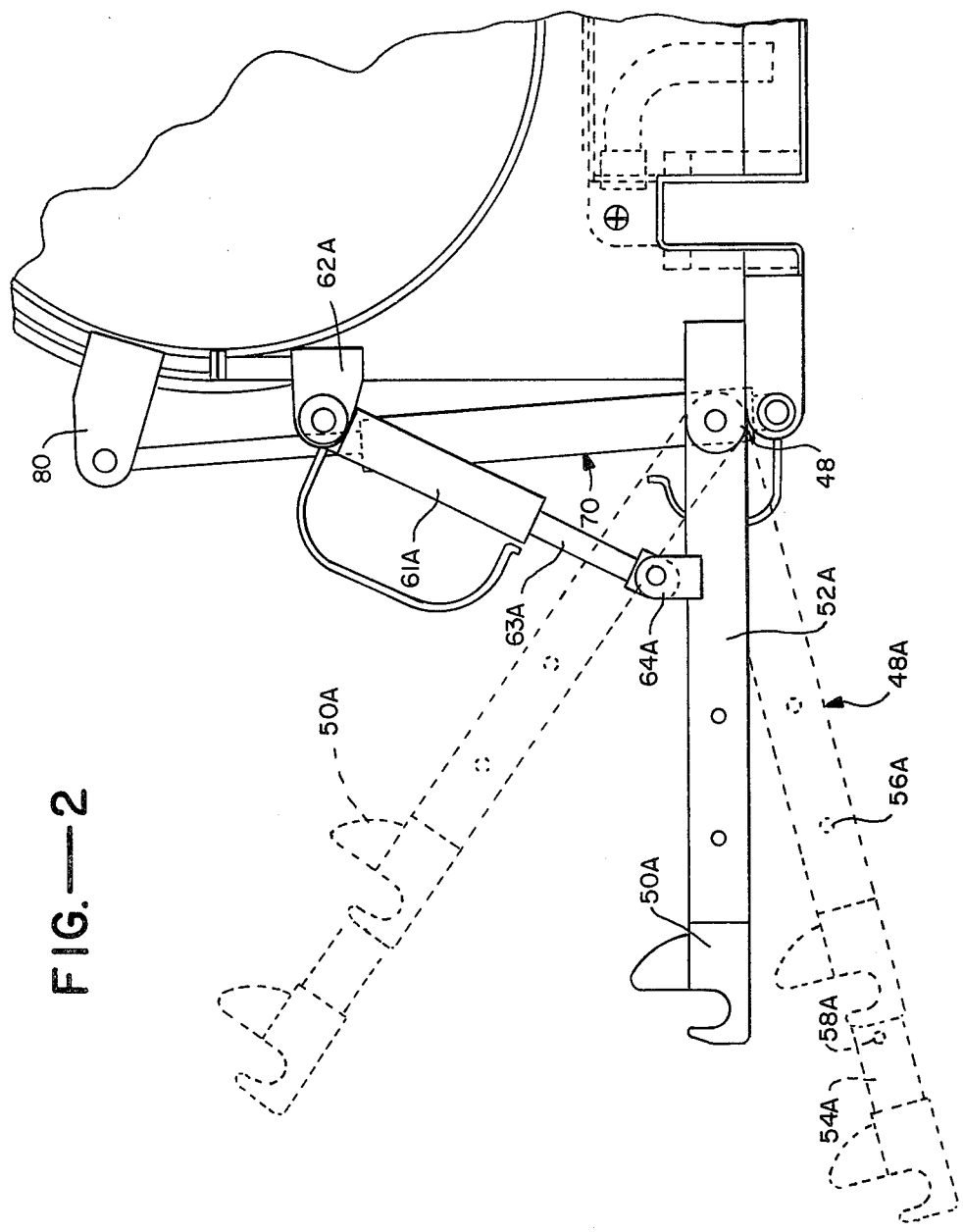

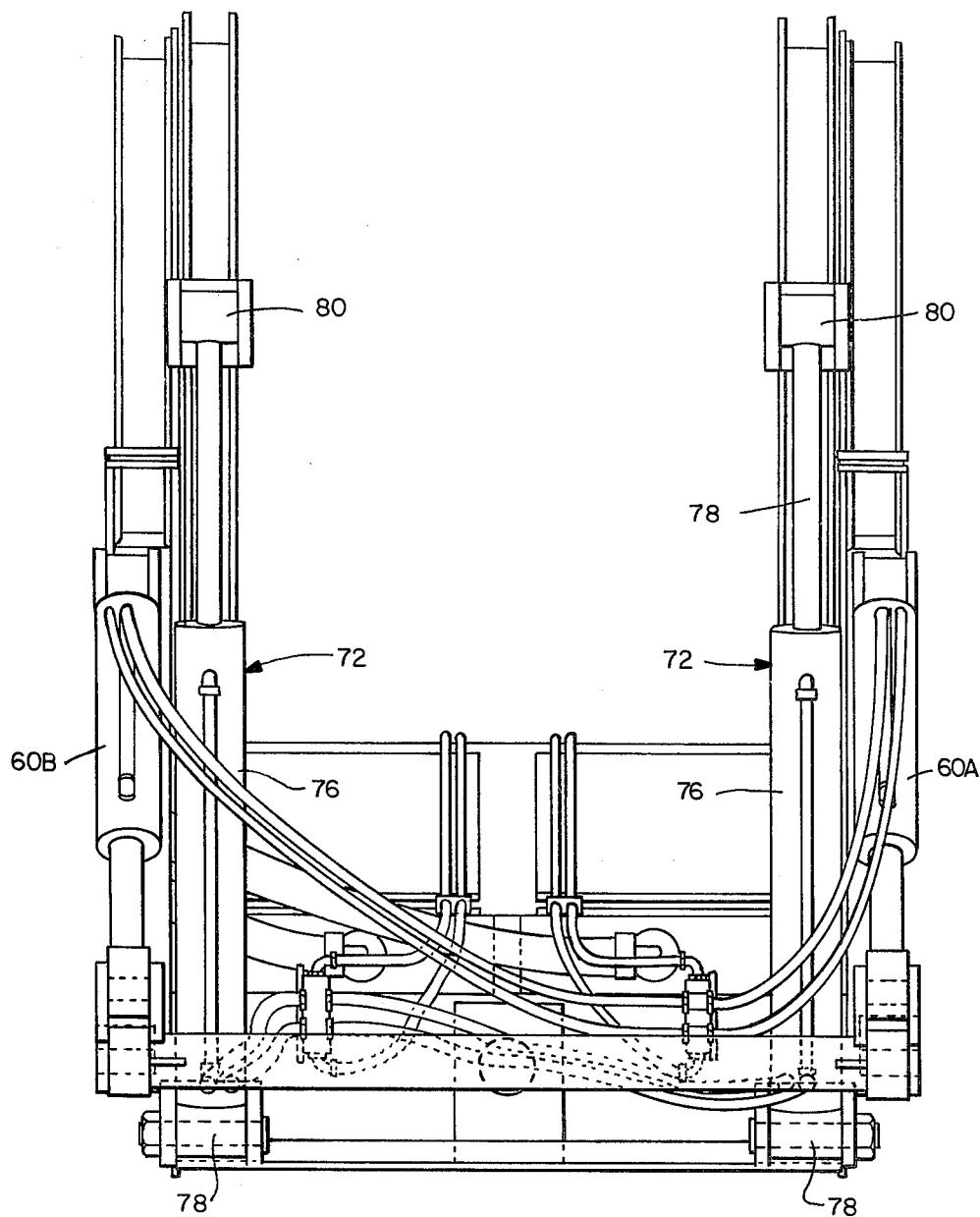
FIG.—3

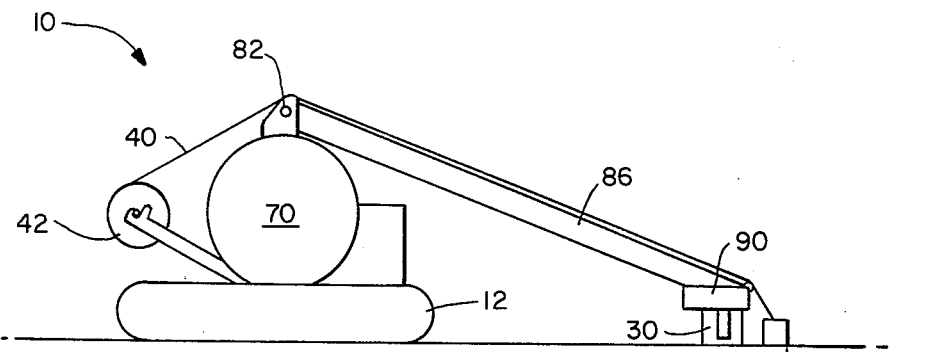
FIG.—4
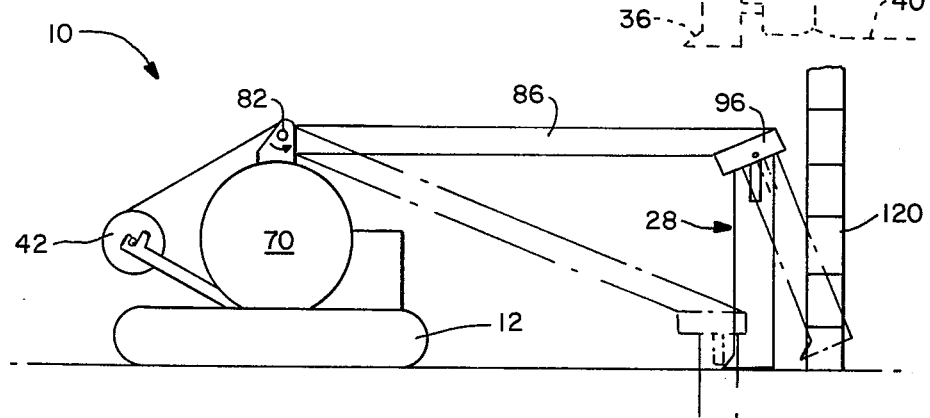
FIG.—5
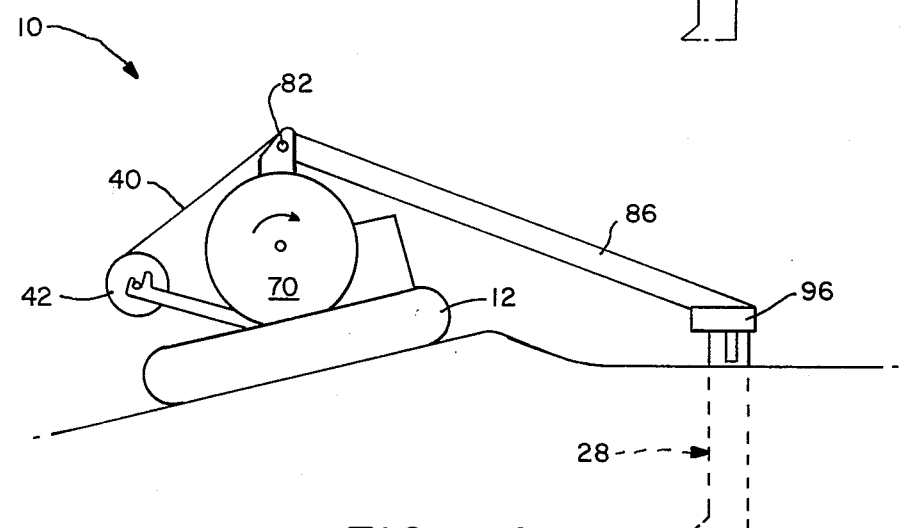
FIG.—6

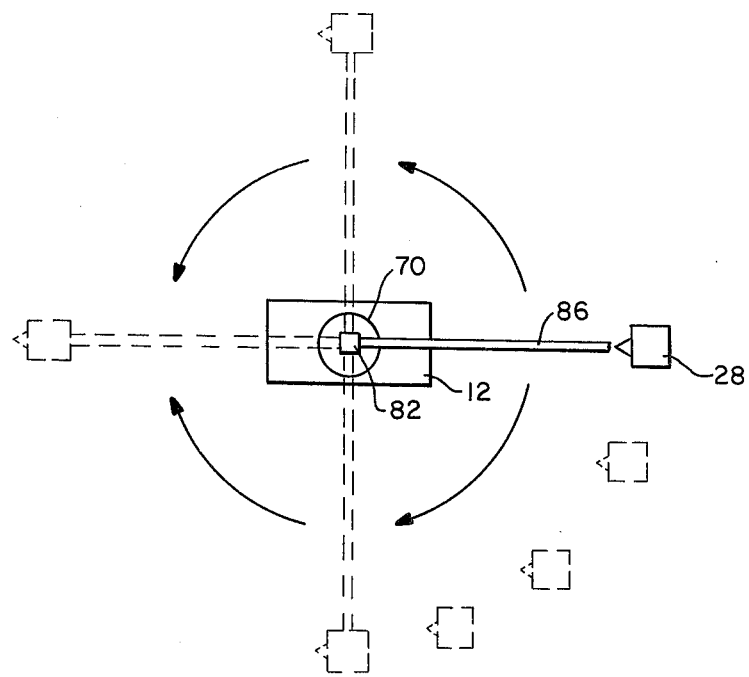
FIG.—7
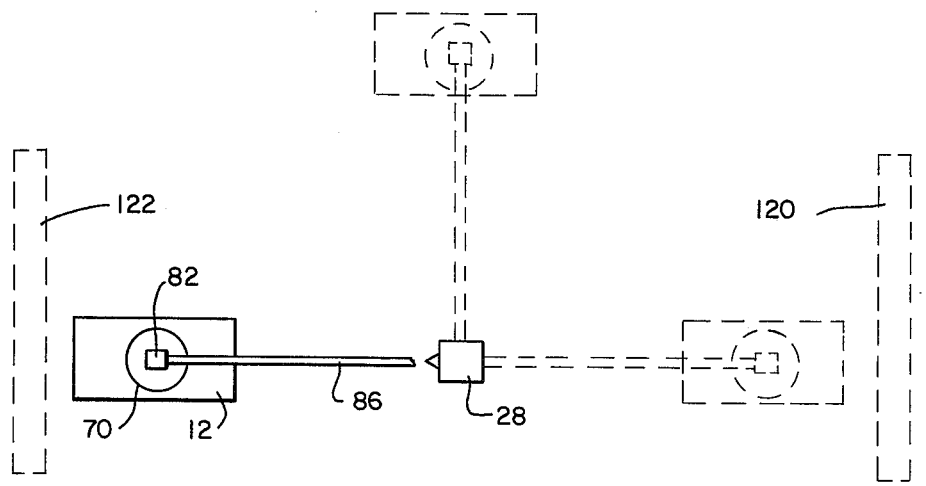
FIG.—8

UNDERGROUND CABLE INSTALLING APPARATUS AND METHOD UTILIZING A MULTI-POSITIONABLE PLOW BLADE

The present invention relates generally to apparatus for installing cable underground and more particularly to a specifically designed apparatus for accomplishing this utilizing a power-driven land vehicle in combination with a cable laying plow blade and a cooperating cable feed mechanism.

One present method of installing electrical cable underground is to utilize a power-driven land vehicle such as a tractor, an associated cable plow blade and a cooperating cable feed mechanism, as recited above. In a typical apparatus of this type, the plow blade is supported by and for movement with the vehicle behind the latter in a way which places a lowermost end portion of the blade in the ground with its cutting edge disposed in the direction of vehicular movement. At the same time, the feed mechanism continuously feeds a supply of cable to an in-ground point on the blade and from there directly into the ground along the path taken by the blade as the latter is pulled behind the vehicle. Movement of the plow blade in this apparatus relative to its associated vehicle is limited to the cable laying in-ground position recited and an above ground, inoperative position immediately over its in-ground position. Heretofore, this has been carried out by means of an elongated boom fixedly connected at one end to the blade and pivotally connected at its other end to a suitable support on the land vehicle.

While the underground cable installing apparatus described above is generally satisfactory for its intended purpose, that is, for laying cable underground, the limited maneuverability of its cable laying plow blade severely limits its overall versatility. More specifically, in the apparatus described, its cable laying plow blade can only be operated in a pulling mode behind its support vehicle. Moreover, the vehicle itself cannot be maneuvered with respect to the blade when the latter is fixed in the ground and, hence, it is not possible to change from a blade pulling mode to a blade pushing mode without removing the blade from the ground. This, in turn, makes it more difficult to lay cables between opposing walls or other above ground abutments. In addition, starting and stopping pits are generally required and, since the blade must follow the path of the vehicle, the path to be taken by the cable must be sufficiently wide for the vehicle itself and capable of supporting the latter.

In view of the foregoing, it is a primary object of the present invention to improve the overall versatility of the underground cable installing apparatus described above by supporting its cable laying blade for movement between a number of different in-ground operating positions relative to its support vehicle.

A more particular object of the present invention is to provide an underground cable installing apparatus of the general type recited and specifically one which can switch between a plow blade pulling mode and a plow blade pushing mode without removing the plow blade from the ground whereby underground cable can be readily installed between opposing walls or similar above ground abutments.

Another particular object of the present invention is to provide an underground cable installing apparatus of the last-mentioned type and specifically one which is capable of placing its cable laying plow blade into the ground and removing it from the ground at a point directly adjacent to a wall or other such above ground abutment without disconnecting the blade from its associated support vehicle.

Still another particular object of the present invention is to provide an underground cable installing apparatus of the last-mentioned type and particularly one which does not require either a starting pit or a stopping pit when initially placing its blade in or removing it from the ground.

Yet another particular object of the present invention is to provide an underground cable installing apparatus of the last-mentioned kind and specifically one which is capable of maintaining its blade at a fixed orientation with the ground and preferably at a fixed depth as the blade moves with its associated support vehicle, even if the latter moves over a somewhat irregular surface terrain.

Still another particular object of the present invention is to provide an underground cable installing apparatus of the last-mentioned type and specifically one which does not require that its cable laying blade take the same path as its support vehicle, thereby making it unnecessary to provide a cable path which also accommodates the vehicle.

As will be described in more detail hereinafter, the underground cable installing apparatus disclosed herein is one which utilizes a power driven land vehicle and an elongated cable laying plow blade having a top end portion, a bottom end portion, and a forward facing cutting edge forming the front edge of the blade's bottom end portion. The blade is supported by and for movement with the vehicle in a way which places its bottom end portion in the ground with the cutting edge disposed in the direction of movement of the vehicle. In accordance with one aspect of the present invention, the overall apparatus includes means supporting the cable laying blade for movement relative to the vehicle between its cable laying position within the ground and an inoperative position above ground, at any desired point along a predetermined peripheral path around the vehicle. In this way, the blade can be pushed in front of or pulled behind the vehicle or it can be placed along either side of the latter, at various laterally spaced points. With the blade in any one of these in-ground operating positions, the overall apparatus includes a supply of cable supported on and movable with the vehicle and means for feeding the cable from its supply to an in-ground point on the blade and from this in-ground point into a trench formed by the blade.

The overall apparatus just discussed briefly and its manner of operation will be described in more detail hereinafter in conjunction with the drawings wherein:

FIG. 1 is a perspective view of the overall underground cable installing apparatus designed in accordance with the present invention;

FIG. 2 is an enlarged side elevational view of a back end portion of the apparatus illustrated in FIG. 1;

FIG. 3 is a back end elevational view of the same portion of the apparatus as illustrated in FIG. 2; and FIGS. 4–8 diagrammatically illustrate the way in which the apparatus of FIGS. 1–3 operate under various circumstances.

Turning now to the drawings, wherein like components are designated by like reference numerals throughout the various figures, attention is directed to FIG. 1 which illustrates an overall apparatus 10 designed in accordance with the present invention for installing electrical cable or other such flexible tubing underground. Apparatus 10 includes a power-driven land vehicle such as tractor 12 having a front end 14, a back end 16 and opposite sides 20, 22. While the land vehicle is shown including continuous tractor threads 24 it could utilize individual wheels and, in either embodiment, is capable of moving in a forward or rearward direction and turning modes in the usual manner.

Apparatus 10 also includes a cable laying plow blade 28 which is best illustrated in its entirety in FIGS. 4–6. As seen in these figures, the blade includes an elongated main body 30 having a forwardly facing front edge 32 and a rearwardly facing back edge 34. Main body 30 supports a forwardly protruding tooth 36 at the bottommost end of its front edge 32. The overall plow blade may be of conventional design and therefore readily provided or it may be specifically designed in accordance with co-pending U.S. patent application Ser. No. 269,968 entitled UNDERGROUND CABLE INSTALLING APPARATUS AND METHOD UTILIZING A FLUID JET ASSISTED, VIBRATING BLADE ARRANGEMENT which was filed on the same data and by the same assignee as the present application. In either case, overall apparatus 10 includes a plow blade support arrangement 38 which is designed in accordance with the present invention and which will be discussed in more detail below. For the moment it should suffice to say that this arrangement supports plow blade 28 for movement with vehicle 12 and movement relative to the vehicle between a cable laying first position partially within the ground and a second above ground position, at any desired point, along a circular path around the vehicle. In this way, as will also be seen below, the blade can be pushed in front of or pulled behind vehicle 12 or moved along either side of the latter at various laterally spaced points.

In addition to vehicle 12, blade 28 and blade support arrangement 38, overall apparatus 10 includes a supply of cable to be installed in the ground and an arrangement for feeding the cable from its supply to an in-ground point on blade 28 when the latter is in its cable laying position and the vehicle is moving and from that in-ground point into the ground along the path taken by the blade. The cable itself which is indicated at 40 is initially stored on vehicle 12 is a wound fashion around a reel or drum 42. The reel is supported on and for movement with the vehicle by a reel support assembly 44 which forms part of the overall cable feed mechanism and which is also designed in accordance with the present invention. This reel support assembly is best illustrated in FIGS. 2 and 3 in conjunction with FIG. 1. As seen there, the assembly includes a pair of telescopic type reel support arms 46A and 46B, each of which is pivotally supported at one end to a front end point on vehicle 12 by suitable means generally indicated at 48 in FIG. 2 (only one such means being shown). The two support arms 46A, 46B are laterally spaced from one another a distance at least equal to the axial extent of reel 42 and each includes a reel supporting flange 50A, 50B, respectively, which serves to support one axial end of the reel directly. As seen best in FIG. 2, the overall support arm 48A includes an outer hollow section 52A, the back end of which is pivotally connected to vehicle 12 at means 48. Flange 50A is fixedly connected to one end of an elongated shaft 54A which is partially disposed within hollow section 52A for manual slidable movement, whereby the position of flange 50A relative to pivot means 48 can be adjusted, thereby adjusting the spacing between the flange and the back of the vehicle 12. In order to maintain flange 54A in a fixed position relative to pivot means 48, outer housing 52A and inner shaft 54A include cooperating openings 56A, 58A respectively which can be aligned with one another for receiving a locking key (now shown). The overall support arm 48B is preferably identical to support arm 48A and therefore includes the corresponding components.

By making the support arms 48A and 48B adjustable in length, they can be readily adjusted to accommodate cable reels of different diameter sizes while, at the same time, maintaining the center of gravity of the supported reel as close to vehicle 12 as possible, which is desirable from a structural standpoint. In addition, the two reel support arms are preferably supported for movement between the downwardly and outwardly inclined position shown by the lowermost dotted line position in FIG. 2 and various pivotally disposed higher positions also shown in FIG. 2. In that way, the reel can be readily placed on flanges 50A, 50B with the latter are maintained close to the ground and, thereafter, both arms and the reel can be moved up into an operating position.

In order to move the reel between ground level and a raised operating position, the overall reel support assembly 44 may include any suitable means. In the specific embodiment illustrated, a pair of electrically, penumatically or hydraulically actuated piston-cylinder units 60A, 60B are utilized. As seen best in FIG. 2, the unit 60A includes a cylinder 61A pivotally connected by means of a flange 62A to vehicle 12. The piston component 63A of the unit is pivotally connected at its otherwise free end to outer section 52A of arm 48A by means of flange 64A. Piston-cylinder unit 60B is similarly interconnected between the vehicle 12 and reel support arm 48B.

As stated previously, overall cable reel support assembly 44 comprises only part of the overall feed mechanism making a part of apparatus 10. The cable feed mechanism also includes means for supporting the cable 40 itself for slidable movement from the reel to a cable feed shoe 66 which is shown only in FIG. 4. The feed shoe forms no part of the present invention and hence will not be discussed in detail. It should suffice to say that this device is fixedly mounted to the back side of plow blade 28 in the manner shown and may either be conventional or of the type described in copending U.S. patent application Ser. No. 269,954, entitled APPARATUS FOR AND METHOD OF INSTALLING UNDERGROUND CABLE HAVING ABOVE GROUND TERMINALS, filed on the same date and by the same assignee as the present application. In either case, the cable feed shoe mechanism receives a continuous supply of cable 40 as seen in FIG. 4 and lays the cable in the trench formed by and directly behind plow blade 28 as the latter is pulled through the soil by vehicle 12.

Having described the various components making up overall cable installing apparatus 10 generally and, in some cases, quite specifically, attention is now directed to a detailed discussion of plow blade support arrangement 38. As best illustrated in FIG. 1, this arrangement includes what may be characterized as a main support unit 70 which may also form part of the overall vehicle 12 to the extent that it serves to contain many of the vehicle components including controls for the vehicle. For reasons to be discussed hereinafter, main support unit 70 is mounted on the bed or main frame of vehicle 12 for limited pivotal movement about a horizontal axis A1 extending laterally across opposite side of the vehicle. Main support unit 70 is pivoted about axis A1 between two extreme positions to be discussed with respect to FIG. 6 by means of a pair of electrically, pneumatically or hydraulically actuated piston-cylinder units 72 which are illustrated in FIGS. 2 and 3. As seen best in FIG. 3, each unit 72 includes a cylinder 76 extending somewhat vertically and having its bottom end pivotally connected to vehicle 12 by suitable means generally indicated at 78. The piston unit 78 comprising part of each unit 72 has its otherwise free end pivotally connected to an appropriate point on main support unit 70 by suitable pivot means. The positional relationship between the two piston-cylinder units and main support unit 70 is selected to provide the desired pivotal movement of the latter about axis A1.

Returning to FIG. 1, overall blade support arrangement 38 is shown also including a boom supporting tower 82 mounted on main unit 70 for pivotal movement therewith. In addition, tower 82 is mounted on unit 70 for its own 360° rotational movement about an axis A2 extending upwardly from the main support unit. A drive motor 84 is supported on tower 82 for rotation therewith and suitable means (not shown) interconnect the drive motor with the tower's means of support for causing the tower to rotate about axis A2 in either a clockwise or counterclockwise direction.

The tower 82 just described supports one end of an elongated boom 86 for limited pivotal movement about a second horizontally extending axis A3. The amount of this movement and the reason for it will be discussed below with respect to FIG. 5. In order to provide this pivotal movement, blade support arrangement 38 utilizes two more electrically, pneumatically or hydraulically actuated piston-cylinder units 88 which are shown only in FIG. 1. Each of these latter units includes a cylinder 89 having its rearwardmost end pivotally connected at the top of and with tower 82 by suitable pivot connecting means 90. The piston component 92 of each unit 88 has its otherwise free end pivotally connected to an associated side of boom 86 at an intermediate point along its length by suitable means generally indicated at 94. When the pistons 92 are in their extended positions, as shown in FIG. 1, the boom 86 extends downwardly and outwardly from the back end of vehicle 12. On the other hand, when the pistons are retracted into their respective cylinders 89, they cause the boom to pivot about axis A3 so as to extend in a somewhat horizontal direction, as illustrated only in FIG. 5.

In addition to the various components thus far described, plow blade support arrangement 38 includes a subarrangement generally indicated at 96 in FIG. 1 for supporting blade 28 to the otherwise free end of boom 86 for limited pivotal movement about a third horizontally extending axis A4 and for 360° rotational movement in either a clockwise or counterclockwise direction about a second vertically extending axis A5. In order to accomplish this, subarrangement 96 includes a horizontally extending blade carrier 98 which is fixedly connected with the uppermost end of blade 28 by bolts or other suitable means indicated at 100. The other end of carrier 98 is mounted to and supported by the underside of a downwardly facing carrier plate 102 so as to rotate 360° about axis A5 as mentioned above. The carrier plate 102 which also forms part of subarrangement 96 is connected to and supported by the otherwise free end of boom arrangement 86 for limited pivotal movement about axis A4. The purpose for each of these movements, that is, the pivotal movement of the blade about axis A4 and its rotational movement about axis A5 will be discussed below with respect to FIGS. 5, 7 and 8. In order to provide each of these movements, subarrangement 96 includes a single electrically, pneumatically or hydraulically actuated piston-cylinder unit 104 and a reversible drive motor 106 which may also be actuated electrically, pneumatically or hydraulically. Unit 104 includes its own cylinder 108 pivotally connected to boom arrangement 86 by suitable means generally indicated at 110 and a piston component 112 pivotally connected at its otherwise free end to the top side of carrier plate 102 by suitable means generally indicated at 114. When the piston 112 is in its extended position as illustrated in FIG. 1, blade 28 extends somewhat vertically, as best seen in FIGS. 5 and 6. When the piston is retracted into cylinder 108, it causes both the carrier plate 102 and blade carrier 98 to pivot about axis A4, thereby causing blade 28 to pivot into an outwardly and downwardly inclined position as illustrated by dotted lines in FIG. 5. The drive motor 106 sits on carrier plate 102 and suitable means are provided interconnecting the drive motor with the carrier itself for rotating the latter either clockwise or counterclockwise about axis A5.

Having described plow blade support arrangement 38 from a structural standpoint, it should be apparent that blade 28 is pivotally movable to a limited extent about axis A1, it is rotationally movable entirely around axis A2 and the overall vehicle 12, in either a clockwise or counterclockwise direction, it is pivotally movable to a limited extent about axis A3, it is pivotally movable to a limited extent about axis A4, and, finally, it is rotationally movable entirely around axis A5, either in a clockwise or a counterclockwise direction. As stated previously, the purpose for each of these movements will be discussed below. However, from a structural standpoint, it is to be understood that the necessary support means for providing these movements may be readily provided and therefore these various means have not been described in detail. This includes the necessary means for supporting main support unit 70 for pivotal movement, the means necessary for supporting tower 82 for rotational movement, the means necessary for supporting boom 86 for pivotal movement and the means necessary for supporting the carrier 98 and carrier plate 102 for pivotal movement and the carrier itself for rotational movement. Moreover, it is to be understood that overall apparatus 10 includes suitable means for individually controlling the actuation of piston-cylinder units 72, drive motor 84, piston-cylinder units 88, drive motor 106 and piston-cylinder unit 108. Preferably, these controls are housed in main unit 70 and, in any event, are made readily accessible to the driver of vehicle 12 along with controls necessary to operate the vehicle itself and the previously recited piston-cylinder units 60A and 60B associated with reel support arms 48A and 48B.

Having described the necessary structural components of apparatus 10 from the standpoint of the present invention, attention is now directed to the way in which the overall apparatus is used to manipulate blade 28 in order to install cable 40 underground along a particular path. To this end, reference is first directed to FIG. 4 which shows the apparatus in a normal operating position with vehicle 12 moving to the left, as viewed in FIG. 4, and blade 32 extending vertically in the ground and moving behind the vehicle. During this movement, cable 40 is continuously fed from reel 42 into the top end of feed shoe 66. The feed shoe is disposed behind blade 28 and lays the cable at the bottom of the trench formed by the plow blade. With apparatus 10 in this operating position, the piston components of piston-cylinder units 60A, 60B are in their retracted positions so that tower 82 extends substantially vertically on main support unit 70, as best seen in FIG. 4. At the same time, the position of tower 82 relative to unit 70 is such that boom 86 extends directly behind vehicle 12. The piston 112 comprising part of piston-cylinder unit 104 is in its extended position so as to maintain blade 28 vertical and the overall blade carrier 98 extends rearwardly behind the boom such that edge 32 and tooth 36 of the plow blade extend in the direction of movement of vehicle 12, that is, to the left as viewed in FIG. 4.

In many cases, it is desirable, if not necessary, to begin or end installation of a cable adjacent an above ground wall such as the one generally indicated at 120 in FIG. 5 or a similar abutment. This could be provided by digging out a relatively long starter trench or pit in front of and perpendicular to wall 120 so that blade 28 can be pivoted into the trench or out of the trench from its raised dotted line position to its lowered dotted line position in FIG. 5. This, of course, assumes an inability to pivot blade 28 about axis A4 (see FIG. 1). However, by providing overall apparatus 10 with the previously described blade pivoting capability about axis 84, blade 28 can be maintained in its vertically extending position as the latter is pivoted about axis A3 (see FIG. 1) between its in-ground position (as illustrated by dotted lines in FIG. 5) and its above ground position (illustrated by solid lines in the same figure). Thus, blade 28 can be initially positioned in-ground at a point adjacent wall 120 by merely digging an appropriately sized hole at the wall and does not require a lengthy starting trench. Once the plow blade is positioned in-ground against wall 120 it can be pulled forward by vehicle 12. As will be seen hereinafter, blade support arrangement 38 has the maneuvering capability to place vehicle 12 behind blade 28 without raising the latter to ground level. Thus, after the blade is moved a sufficient distance from wall 120, vehicle 12 can be positioned behind the blade for pushing the latter. In this way, the blade can be pushed directly adjacent a second wall and the plow blade can be withdrawn at that point, thereby eliminating the need for a long exit trench.

Referring to FIG. 6, attention is now directed to the way in which apparatus 10 compensates for angled or vertical movement of vehicle 12 as the latter moves across uneven terrain. As seen in this latter figure, as the vehicle moves to the left and the plow blade follows it, the orientation of boom tower 82 depends on and varies with the angle of orientation of the terrain, unless compensated for. Thus, as vehicle 12 moves downhill as shown in FIGS. 6, the boom tower 82 pivots slightly forward, again unless compensated for. This uncompensated movement will, in turn, cause the boom 86 to move upward and thus pull the plow blade 28 up with it. While these various undesirable changes can be compensated for by appropriately pivoting the boom 86 about axis A3 and/or by pivoting blade 28 itself and its associated carrier 98 about axis A4, it is substantially less complicated to merely pivot the entire main support unit 70 about axis A1 as illustrated in FIG. 6 in order to maintain boom 86 and blade 28 in fixed orientations relative to the horizontal, regardless of the changes in terrain taken by vehicle 12. This, of course, presupposes relatively small fluctuations in the terrain. Should the terrain fluctuate from the horizontal to a large extent, it might be necessary to compensate for these changes by pivoting boom 86 and/or blade 28 about axes A3 and A4, respectively. In any event, by providing blade support arrangement 38 with the ability to pivot the entire main unit 70 about axis A1, the overall apparatus is additionally provided with adjustable reaching capabilities with respect to the blade itself. More specifically, by pivoting the main unit either clockwise or counterclockwise so that tower 82 moves from its inner vertically extending position to an extreme clockwise or counterclockwise position, the plow blade can be made to be further from or closer to vehicle 12.

In addition to the various features thus far described, blade supporting arrangement 38 has the maneuvering capabilities of placing blade 28 behind vehicle 12 so that the latter can pull the blade, as described above, with respect to FIGS. 4, 5, and 6, in front of vehicle 12 (see FIG. 7) so that the blade can be pushed, or at various positions along either side of the vehicle (also see FIG. 7). This is accomplished by rotating the entire boom 86 about axis A2. At the same time, blade 28 can be rotated about axis A5 in order to maintain front edge 32 and tooth 36 in a forwardly directed position. On the other hand, it may be desirable to actually cause the blade and the cable behind it to follow the curved path made by the othermost end of the boom, in which case blade 28 could be made to pivot about axis A5 in a way which causes it to remain in line with its curved path of movement.

In FIG. 7, the maneuvering capability of blade 28 is shown with respect to vehicle 12. More often than not, it will be desirable to maneuver the vehicle relative to blade 28 when the latter is in its cable pulling or pushing in-ground position. This is best illustrated in FIG. 8. As seen there, the blade 28 is shown in a fixed position and vehicle 12 is shown moving about the blade in a circular fashion from a blade pulling mode to a blade pushing mode. This is accomplished by causing vehicle 12 to drive around axis A5 as the blade remains fixed in the ground. In order to do this, the vehicle also pivots about axis A2. Thus, blade 28 can be initially installed in the ground in its cable pulling mode adjacent wall 120 as discussed with respect to FIG. 5. Thereafter, when the blade is pulled out a sufficient distance from wall 120 as in FIG. 8, the entire vehicle can be maneuvered around to the backside of the blade and the latter can be pushed up against a second wall 122.

What is claimed is:

1. An apparatus for installing cable underground, comprising: a power driven land vehicle having a front end, a back end and opposite sides; an elongated cable laying plow blade; a plow blade support arrangement mounted on said land vehicle and supporting said blade for movement with said vehicle, said arrangement having means including a boom supporting said blade and said boom for movement relative to said vehicle between a first cable laying position so that the blade is disposed within the ground and an inoperative second position with the blade above the ground, at any desired point along a predetermined 360° path around said vehicle and around a vertical axis through said vehicle, without having to move said vehicle, said supporting means also including means connecting said blade to the front end of said boom for 360° rotational movement about an axis parallel with said blade whereby said blade can be pushed in front of or pulled behind said vehicle or moved along either side of the latter at various laterally spaced points; means including a supply of cable supported on and movable with said vehicle; and means for feeding said cable from its supply to an in-ground point on said blade when the latter is in its cable laying position and said vehicle is moving and from said in-ground point on said blade into the ground along the path taken by said blade.

2. An apparatus according to claim 1 wherein said blade extends substantially vertically when disposed in said cable laying first position and wherein said supporting means includes means supporting said blade in a vertical position throughout its movement between said cable laying first position and said inoperative second position.

3. An apparatus according to claim 1 wherein said arrangement includes means supporting said first-mentioned supporting means and said blade for limited pivotal movement about a horizontal axis.

4. An apparatus according to claim 1 wherein said arrangement includes a main support unit and wherein said supporting means includes a tower mounted on said main support unit for 360° rotational movement about a substantially vertical axis corresponding to said first-mentioned vertical axis and supporting the back end of said boom and therefore said blade for said rotational movement, and means connecting said boom to said tower for pivotal movement about a horizontal axis for moving said blade between said cable laying first position and said inoperative second position.

5. An apparatus according to claim 4 wherein said supporting means includes means connecting said blade and first-mentioned connecting means to said boom for pivotal movement about a horizontal axis parallel with said first-mentioned horizontal axis.

6. An apparatus according to claim 1 wherein said cable supply means includes a reel for initially supporting said cable in a wound fashion and means connected with said vehicle for supporting said reel in various adjustable positions relative to said vehicle between a lowermost position adjacent ground level and an uppermost position above ground level.

7. An apparatus according to claim 6 wherein said reel supporting means supports said reel such that the center of said reel is a certain spacing from said vehicle, said reel supporting means including means for varying said spacing whereby to be able to vary the size of reel.

8. An apparatus for installing cable underground, comprising: a power driven land vehicle having a front end, a back end and opposite sides; a cable laying elongated blade having its own axis; a blade support arrangement mounted on said vehicle and supporting said blade for movement therewith, said arrangement including a main support unit mounted on said vehicle for limited pivotal movement about a horizontal axis extending across the opposite sides of said vehicle, a beam supporting tower mounted on said unit for pivotal movement therewith and for 360° rotational movement about an axis extending upwardly from said main support unit, an elongated boom having one end supported by said tower for rotational and pivotal movement therewith and also for limited pivotal movement about another horizontal axis, means supporting said blade to the otherwise free end of said boom for pivotal and rotational movement therewith and for 360° rotational movement about an axis parallel to its own axis whereby said blade is movable between a vertically extending cable laying first position within the ground and an inoperative second position above the ground, at any point along a circular path around said vehicle, thus allowing said blade to be pushed in front of or pulled behind said vehicle or moved along either side of the latter at various laterally spaced points, said supporting means also supporting said blade to said boom for limited pivotal movement about still another horizontal axis so as to maintain said blade in a vertical direction during its movement between said first and second positions; means including a supply of cable supported on and movable with said vehicle; and means for feeding said cable from its supply to an in-ground point on said blade when the latter is in its cable laying position and said vehicle is moving and from said in-ground point on said blade into the ground along the path taken by said blade.

9. An apparatus according to claim 8 wherein said cable supply means includes a reel for initially supporting said cable in a wound fashion and means connected with said vehicle for supporting said reel in various adjustable positions relative to said vehicle between a lowermost position adjacent ground level and an uppermost position above ground level.

10. An apparatus according to claim 8 wherein said reel supporting means supports said reel such that the center of said reel is a certain spacing from said vehicle, said reel supporting means including means for varying said spacing whereby to be able to vary the size of reel.

11. A method of installing cable underground from a first point to a second point, comprising the steps of: connecting an elongated cable laying plow blade to a power driven land vehicle; placing said blade in the ground at said first point; pulling said blade with and behind said tractor from said first point towards but stopping short of said second point; before reaching said second point and while said blade remains stationary in the ground and connected to said vehicle, moving the latter to a position behind said blade; thereafter pushing said blade to said second point; at said second point, removing said blade from the ground; and while said blade moves from said first to said second point, feeding cable to said blade such that the latter lays said cable in the ground along the path of movement.

12. A method according to claim 11 wherein said blade is placed in the ground at said first point and removed from the ground at said second point while constantly being maintained in a vertically extending position.

* * * * *